United States Patent [19]
Saitoh

[11] Patent Number: 5,320,027
[45] Date of Patent: Jun. 14, 1994

[54] LUBRICANT SEALED BEARING FOR FORWARD AND REVERSE ROTATION OF ROTATING MEMBERS

[75] Inventor: Takashi Saitoh, Kawasaki, Japan
[73] Assignee: Tokiko Ltd., Japan
[21] Appl. No.: 850,453
[22] Filed: Mar. 10, 1992

[30] Foreign Application Priority Data
Mar. 15, 1991 [JP] Japan ............... 3-075640

[51] Int. Cl.⁵ .............................. F01B 31/10
[52] U.S. Cl. ................... 92/158; 92/DIG. 1; 384/473
[58] Field of Search .......... 384/473, 488; 92/153, 92/DIG. 1, 158, 187

[56] References Cited
U.S. PATENT DOCUMENTS

| | | | |
|---|---|---|---|
| 1,520,688 | 12/1924 | Barks et al. | 384/473 |
| 1,817,867 | 8/1931 | Bailey | 384/473 |
| 3,663,077 | 5/1972 | Nakamura et al. | 384/473 |

FOREIGN PATENT DOCUMENTS

| | | | |
|---|---|---|---|
| 1025441 | 4/1953 | France | 384/473 |
| 107584 | 5/1991 | Japan. | |
| 518235 | 2/1940 | United Kingdom | 384/473 |

Primary Examiner—Edward K. Look
Assistant Examiner—F. Daniel Lopez
Attorney, Agent, or Firm—Andrus, Sceales, Starke & Sawall

[57] ABSTRACT

A lubricant sealed bearing, which is provided between a piston pin and a small end part of a connecting rod, comprises at least one rolling element and at least one grease standing ring. The grease standing ring is adjacent to an end portion in an axial direction of the small end part. A capacity of a grease pool defined by grease standing ring and an end side in the axial direction of the outer ring, is 40-60% of a theoretical amount of the grease extruded by the rolling element, the movement of the rolling element being caused by the movement of the piston from a top dead point to a bottom dead point and vice versa.

18 Claims, 4 Drawing Sheets

LUBRICANT SEALED BEARING FOR FORWARD AND REVERSE ROTATION OF ROTATING MEMBERS

BACKGROUND OF THE INVENTION

The present invention relates to a lubricant sealed bearing for reciprocatively rotating members, of oil-less type reciprocating machines. Such machines include, for example, compressors, vacuum pumps, etc.

FIG. 1 shows a longitudinal sectional view of an oil-less type reciprocating motion compressor, as one example of oil-less type reciprocating machines, which compressor is applied to a grease sealed bearing. This bearing is one example of a conventional lubricant sealed bearings. FIG. 2 shows an enlarged longitudinal sectional view of a connecting portion of the compressor shown in FIG. 1, in which a small end part of a connecting rod and a piston pin are connected to each other. The oil-less type reciprocating motion compressor shown in FIG. 1 and FIG. 2 has an approximately cylindrical shaped cylinder 1, and a cylinder head 2 mounted on the cylinder 1 through a valve plate 3. A suction chamber 2A and a discharge chamber 2B are formed on the valve plate 3 located in this cylinder head 2. Also an approximately cylindrical shaped piston 4 is inserted to fit inside the cylinder 1. This piston 4 is reciprocatively movable in the up and down directions as viewed in FIG. 1 inside the cylinder 1. A compression chamber 5 as a sealing chamber is formed between the piston 4 and valve plate 3.

A suction hole 3A and discharge hole 3B are formed on the above mentioned valve plate 3. The suction chamber 2A and the discharge chamber 2B open into the compression chamber 5 through the suction chamber 3A and discharge chamber 3B, respectively. Also a suction valve 6 is provided on the compression chamber 5 side of the suction hole 3A. A discharge valve 7 is provided on the discharge chamber 2b side of the discharge hole 3B. Further one pair of through holes 4A, 4A are formed on left and right sides of FIG. 1 in a radial direction of the piston 4. An approximately cylindrical shaped piston pin 8 is inserted to be fitted inside the through holes 4A, 4A by means of pipe-shaped thermal insulating elements 9, 9 made of polytetrafluoroethylene etc.

A small end part 10A, which is a top end part of a connecting rod 10 viewed in FIG. 1, is connected to the center portion of the piston pin 8 and a bottom end (not shown) of this connecting rod 10 is connected to a crankshaft (not shown) so as to be rotationally movable to each other. Thus the connecting rod 10 connects the piston pin 8 and the above mentioned crankshaft to each other. Also, a bearing hole 10B, in which the piston pin 8 is inserted, is formed on the small end part 10A of the connecting rod 10. Thus the connecting rod 10 is connected with the piston 4 so as to be rotationally movable to each other by means of the piston pin 8 inserted in the bearing hole 10B of the small end part 10A.

A grease sealed bearing 11 is fitted as shown in FIG. 2 between an inner peripheral surface of the bearing hole 10B of the small end part 10A of the connecting rod 10 and a peripheral surface of the piston pin 8. This grease sealed bearing 11 has a plurality of needle rollers 12, 12, ... as rolling elements each having an approximately cylindrical shape, a center lines of which plurality of rollers are parallel to a center line A of the piston pin 8. These needle rollers 12, 12, ... are located at equal intervals from each other so as to surround a peripheral surface of the piston pin 8. Maintenance elements (not shown) for maintaining the needle rollers 12, 12, ... at equal intervals from each other are located respectively on the intervals between the needle rollers 12, 12, .... Also, each of the needle rollers 12, 12, ... rolls accompanying a rolling of the small end part 10A of the connecting rod 10 against the piston pin 8. The rolling course of the each of the needle rollers 12, 12, ... describes a circle, a center of which circle coincides with the center line A of the piston pin 8. A smooth rotation of the small end part 10A of the connecting rod 10 against the piston pin 8 is ensured by these respective rolling movements of the needle rollers 12, 12, ... between the small end part 10A and piston pin 8.

Further, holding rings 13, 13 are provided inside the bearing hole 10B of the small end part 10A so as to sandwich each of the needle rollers 12, 12, ... by both end sides of an axial direction of the rollers 12, 12, .... These holding rings 13, 13 prevent the positions of the needle rollers 12, 12, ... from shifting toward both side of the axial direction of the rollers 12, 12, .... Also approximately ring-shaped oil seals 14, 14 are provided on both sides of axial direction of the bearing hole 10B.

Further, in the grease sealed bearing 11, grease G for lubrication is filled in a space formed between the inner peripheral surface of the bearing hole 10B and the peripheral surface of the piston pin 8 and in the intervals between the needle rollers 12, 12, .... The grease G is sealed inside the grease sealed bearing 11 by the oil seals 14, 14.

In a conventional oil-less type reciprocating motion compressor having the above mentioned construction, the crankshaft is rotationally driven by an external driving source, and the connecting rod 10 connected to the crankshaft is reciprocatively moved. Also the connecting rod 10 is swung, being caused by the rotational motion of the crankshaft. This movement of the connecting rod 10 is transmitted to the piston 4 via the piston pin 8 and the grease sealed bearing 11, so that the piston 4 reciprocatively moves in the up and down directions as viewed in FIG. 1 inside the cylinder 1. During this reciprocating movement of the piston 4, the piston 4 is moved from a top dead point of the crankshaft to a bottom dead point of it, which movement is referred to as suction process. On the suction process, the pressure of the compression chamber 5 is reduced. Therefore the suction valve 6 is opened, and air is drawn into the compression chamber 5 from the suction chamber 2A through the suction hole 3A. Also air is drawn from outside to the suction chamber 2A. Further, a movement of the piston 4 from the bottom dead point of the crankshaft to the top dead point of it is referred to as a compression process. During the compression process, the air of the compression chamber 5 is compressed. Therefore the discharge valve 7 is opened, and the compressed air in the compression chamber 5 is discharged to the discharge chamber 2B through the discharge hole 3B. Then the compressed air discharged to the discharged chamber 2B is supplied to the outside.

According to one example of the conventional oil-less type reciprocating motion compressor described above, the grease sealed bearing 11 is provided between the piston pin 8 of the piston 4 and the small end part 10A of the connecting rod 10. Also each of the needle rollers 12, 12, ... of the grease sealed bearing 11, the above mentioned piston pin 8 and the bearing hole of the small end part 10A are lubricated by the grease G. Each of the needle rollers 12, 12, . . . rotates along a circumferential direction on the peripheral surface of the piston pin 8, the rotation of the rollers 12, 12, . . . being caused by the rotation of the small end part 10A against the piston pin 8. There is a case where the grease G, which is filled in the equal intervals between the needle rollers 12, 12, . . . , is extruded to both sides in the axial direction of the rollers 12, 12, . . . , the extrusion being caused by the rotation of the each of the needle rollers 12, 12, . . . .

Each of the needle rollers 12, 12, . . . moves alternately in forward and reverse directions, resulting from the alternating rotation in both forward and reverse directions of the small end part 10A, this special movement being caused by the above mentioned swinging motion of the connecting rod 10. The swinging motion occurs when the connecting rod 10 is driven by the crankshaft. The rotation of each of the needle rollers 12, 12, . . . makes the grease G filling the intervals of between the needle rollers 12, 12, . . . shake violently. Also the grease G has a certain amount of inertia, because it has rather higher viscosity than other lubricants. Therefore there are some cases where the grease G cannot follow the alternate rotation of the needle rollers 12, 12, . . . . Due to this reason, in the case where the grease G is extruded to both end sides of the axial direction of each of the needle rollers 12, 12, . . . , this extruded grease G exerts a pressure against each of the oil seals 14, 14 of both end sides in the axial direction of the bearing hole 10B.

There is the case when the grease G, which is sealed inside the grease sealed bearing 11 by the oil seals 14, 14 as mentioned above, leaks outside the both end sides in the axial direction of each of the oil seals 14, 14. This leaking is caused from such portions of the seals 14, 14 that the sealing performance is weakened. Being weakened of the sealing performance there results in the above mentioned pressure of the grease G against the each oil ssal 14 being exerted by the alternating rotation of each of the needle rollers 12, 12, . . . . In that case, the quantity of the grease in the grease sealed bearing 11 decreases. Because of this, the quantity of the grease G in the periphery of each of the needle rollers 12, 12, . . . becomes short. Also the quantity of the lubrication in the periphery of each of the needle rollers 12, 12, . . . and between the piston pin 8 and the small end part 10A becomes insufficient. Therefore life time of the grease sealed bearing 11 is shortened. Also, there is a problem in that a part of the grease G, which leaks outside via each of the oil seals 14, 14, enters into the compression chamber 5. For example, this intruded grease is mixed with the compressed air in the compression chamber 5. As the result of this, clean compressed air cannot be supplied to the outside.

SUMMARY OF THE INVENTION

The object of the present invention is to provide a lubricant sealed bearing as described below. Lubricant is prevented for a long time from leaking outside, which lubricant is extruded by at least one rolling element. The alternate rotation of the rolling element is caused by the rotation of a shaft part and a bearing part to each other in the forward and reverse directions. Also, a stable supply of lubricant to the above mentioned rolling element can be ensured. The construction of the lubricant sealed bearing is as described below. It includes the above mentioned rolling element, which is located to be movable in a rolling manner between the above mentioned shaft part and the bearing part. The periphery of the rolling element is filled with the lubricant between the shaft part and bearing part. Also, the bearing has at least one lubricant standing member, which defines a lubricant pool for catching lubricant discharged from the above mentioned lubricant sealed bearing. Further, a capacity of the lubricant pool defined by the lubricant standing member is approximately 40-60% of the amount of lubricant described below. Theoretically, this amount of lubricant is extruded by the rolling element. The rolling element extrudes this amount of lubricant by the alternate rotation mentioned above caused by the rotation mentioned above of the shaft part and the bearing part to each other in both the forward and reverse directions.

The other object of the present invention is to provide an oil-less type reciprocating motion machine as described below. Lubricant is prevented from leaking outside for a considerable period of time, which lubricant is extruded by the rolling element. The rotation of the rolling element is caused by the movement of the oil-less type reciprocating motion machine. Also, a stable supply of lubricant to the above mentioned rolling element can be ensured.

The construction of the oil-less type reciprocating motion machine will be described below. It includes a cylinder, which has a sealing chamber formed inside thereof; a piston, inserted inside the cylinder to be movable in a reciprocating manner, which defines the sealing chamber inside the cylinder; a piston pin, which is provided in the piston; a connecting rod, a small end part of which is connected to the piston pin, and a large end part of which is connected to a crankshaft. Also the oil-less type reciprocating motion machine has a lubricant sealed bearing. The lubricant sealed bearing is provided between a piston pin inserting hole formed on the small end part of the connecting rod and the above mentioned piston pin. The lubricant sealed bearing ensures smooth rotation of the small end part of the connecting rod against the piston pin. Further, the oil-less type reciprocating motion machine has at least one lubricant sealing member. This lubricant sealing member is provided between the end of the piston pin inserting hole in an axial direction thereof formed on the small end part of the connecting rod and the piston pin. Two lubricant sealing members may be provided in both ends of the piston pin inserting hole in an axial direction thereof.

Further, the above mentioned lubricant sealed bearing has a plurality of rolling elements located between the above mentioned piston pin inserting hole and the above mentioned piston pin. A lubricant containing space is defined by the piston inserting hole, the piston pin and the rolling elements. The lubricant containing space is filled with the lubricant. Also, the lubricant sealed bearing has holding members. These holding members are provided on both end sides in an axial direction of the lubricant sealed bearing. These holding members are provided to prevent the rolling elements from shifting in the axial direction of the bearing.

Further, the above mentioned lubricant sealed bearing has at least one lubricant standing member. This lubricant standing member is provided between the above mentioned piston pin inserting hole formed in the small end part of the above mentioned connecting rod and the above mentioned piston pin. Also, this lubricant standing member is adjacent to an opening portion formed on the above mentioned lubricant sealed bearing. This lubricant standing member forms a lubricant pool for catching the lubricant discharged from the above mentioned lubricant sealed bearing. Also, the above mentioned lubricant standing member is formed with a lubricant supply path. This lubricant supply path supplies the above mentioned lubricant into the above mentioned lubricant sealing member. Two lubricant pools may be provided, each of the pools being defined by respective one of the lubricant standing members. In this case, each of the lubricant supply paths is provided in respective one of the two lubricant standing members.

Further, a capacity of the lubricant pool defined by the lubricant standing member is approximately 40–60% of the amount the lubricant mentioned below. In case of two lubricant pools being provided, a total capacity of both of the two pools is approximately 40–60% of the amount. This amount is extruded by the rolling elements theoretically. The rolling elements of the lubricant sealed bearing extrude this amount of lubricant by rotating, which rotating is caused by the movement of the above mentioned crankshaft of the above mentioned oil-less type reciprocating motion machine from a top dead point to a bottom dead point or from the bottom dead point to the top dead point.

By means of the present invention, the life time of the lubricant sealed bearing can be extended. Also, in the case where, for example, the oil-less type reciprocating motion machine is a compressor, clean fluid such as clean compressed air can be supplied.

Further objects and features of the present invention will be clarified by referring to the following description and the accompanying drawings.

DESCRIPTION OF THE PREFERRED EMBODIMENT

Figures 1, 2:
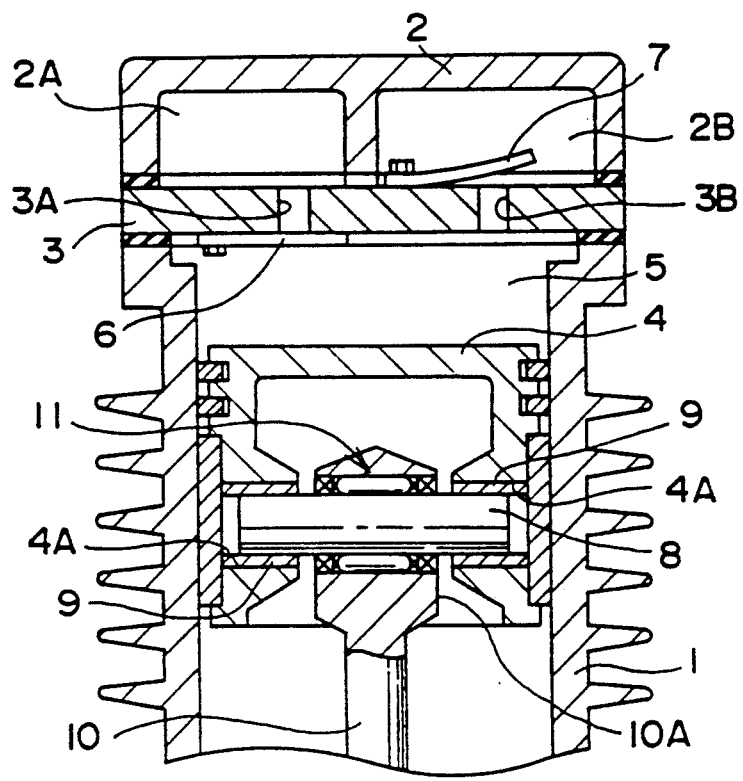
FIG. 1 is a longitudinal sectional view of one example of an oil-less type reciprocating motion compressor, which includes a conventional grease sealed bearing, and which compressor can also include grease sealed bearings according to first and second embodiments of the present invention respectively.
FIG. 2 is an enlarged longitudinal sectional view of a connecting portion of the compressor shown in FIG. 1, in which a small end part of a connecting rod and a piston pin are connected to each other, this connecting portion is an essential element of the compressor.

In the following description of the embodiments, a description regarding members corresponding to members of the conventional example of the connecting portion shown in FIGS. 1 and 2 has been omitted, and such corresponding members have the same reference numerals applied thereto. The connecting portion shown in FIG. 3 can be applied to such compressor as shown in FIG. 1.

Figure 3:
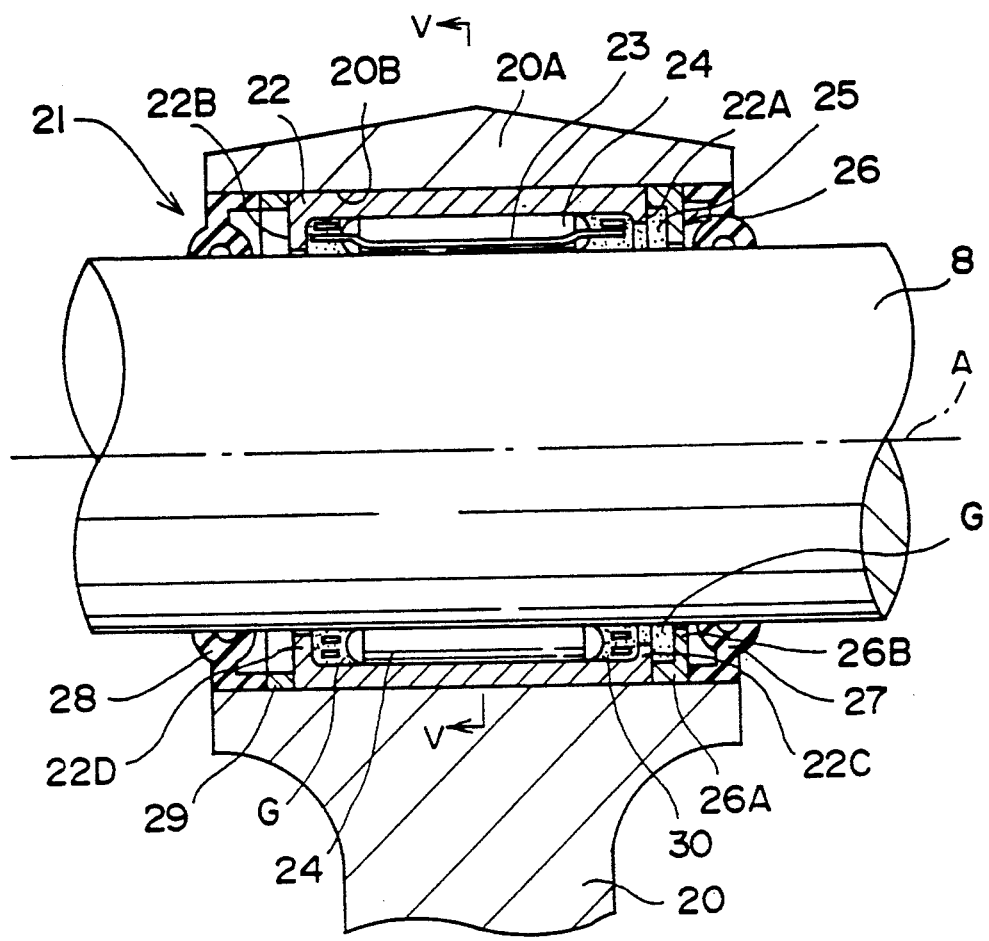
FIG. 3 is an enlarged longitudinal sectional view of a connecting portion of oil-less type reciprocating motion compressor in which portion a small end part of a connecting rod and a piston pin are connected to each other, this connecting portion being an essential element of the compressor. The compressor includes a grease sealed bearing according to the first embodiment of the present invention applied to it.

This connecting portion shown in FIG. 3, in which a small end part of a connecting rod and the piston pin are connected to each other, comprises, in general, the cylindrical shaped piston pin 8 serving as a shaft part, and the connecting rod 20, which is inserted with the piston pin 8 in a cylindrical shaped bearing hole 20B. The bearing hole 20B is provided on a small end part 20A as a bearing part. Also a grease sealed bearing 21, according to this embodiment of the invention, is fitted between the piston pin 8 and the bearing hole 20B.

The connecting rod 20 has a construction approximately similar to the connecting rod 10 of the conventioal example of the connecting portion shown in FIG. 2. That is, the bearing hole 20B is formed between left side and right side on FIG. 3 of the small end part 20A, which small end part 20A is a top portion of the connecting rod 20 viewed in the same drawing. The grease sealed bearing 21, as a lubricant sealed bearing, has grease serving as a lubricant applied to it.

This grease sealed bearing 21 comprises: in general, an outer ring 22, which is press fitted on the center of the bearing hole 20B of the small end part 20A of the connecting rod 20; a plurality of needle rollers 24, 24, . . . as rolling elements, which are located between an inner wall of the outer ring 22 and a peripheral surface of the piston pin 8; a grease standing ring 26, as a lubricant standing member, which is fitted on one side in an axial direction (right side of FIG. 3) of the outer ring 22; oil seals 27, 28 as lubricant sealing members, which are fitted on both end sides in the axial direction of the bearing hole 20B; and a spacer 29, which is fitted so as to be spaced between an end surface 22B of another side (left side of FIG. 3) of the outer ring 22 and oil seal 28.

The outer ring 22 has a shape like a cylinder, a center of which coincides with a center line A of the piston pin 8. The grease standing ring 26, the oil seals 27, 28 and the spacer 29 have respectively a ring shape, a center of each ring coinciding with the center line A of the piston pin 8. The needle rollers 24, 24, . . . have respectively a shape similar to a cylinder, a center of which is parallel to the center line A of the piston pin 8. These needle rollers 24, 24, . . . are located on the periphery of the piston pin 8 at equal intervals from each other so as to surround the periphery of the piston pin 8. Maintenance elements 23, 23, . . . are located in the equal intervals between the needle rollers 24, 24, . . . so as to maintain the rollers 24, 24, . . . at equal intervals from each other. Further, the periphery of each of the needle rollers 24, 24, . . . is filled with grease G as a lubricant.

The above mentioned grease standing ring 26 is provided between the outer ring 22 and the oil seal 27. A grease pool 25 serving as a lubricant pool is defined by the grease sealed standing ring 26, between the grease standing ring 26 and an end surface of the above mentioned one side of the outer ring 22.

The oil seals 27, 28 are provided for sealing a space between an inner wall of the bearing hole 20B and the peripheral surface of the piston pin 8, on both end sides in an axial direction of the bearing hole 20B of the small end part of the connecting rod 20 respectively. The grease G is sealed by these oil seals 27, 28 into a ring-shaped space defined by the inner wall of the bearing hole 20B, the peripheral surface of the piston pin 8 and the oil seals 27, 28.

In the grease sealed bearing 21, a grease containing space 30 is defined by the inner wall of the outer ring 22, the peripheral surface of the piston pin 8 and periphery of each of the needle rollers 24, 24, . . . . This grease containing space 30 is filled with the grease G. The periphery of the each needle rollers 24, 24, . . . is also filled with this grease G. Also, rib parts 22C, 22D each shaped as a ring, and a center of each coinciding with the center line A of the piston pin 8, are formed on both end sides in an axial direction of the outer ring 22 so as to be as one piece with it respectively. Each of the rib parts 22C and 22D is respectively provided on the entire periphery of the inner wall of the outer ring 22. Also, each of rib parts 22C and 22D is respectively protruded in direction toward the center line A, that is, toward the peripheral surface of the piston pin 8. Further, an inner peripheral surface of the rib part 22C and the peripheral surface of the piston pin 8 are so opposed to each other that a rather large space is formed between them. On the other hand, an inner surface of the rib part 22D and the peripheral surface of the piston pin 8 are so opposed to each other that a rather infinitesimal space, which serves as a restrictor, is formed between them.

Figure 4:
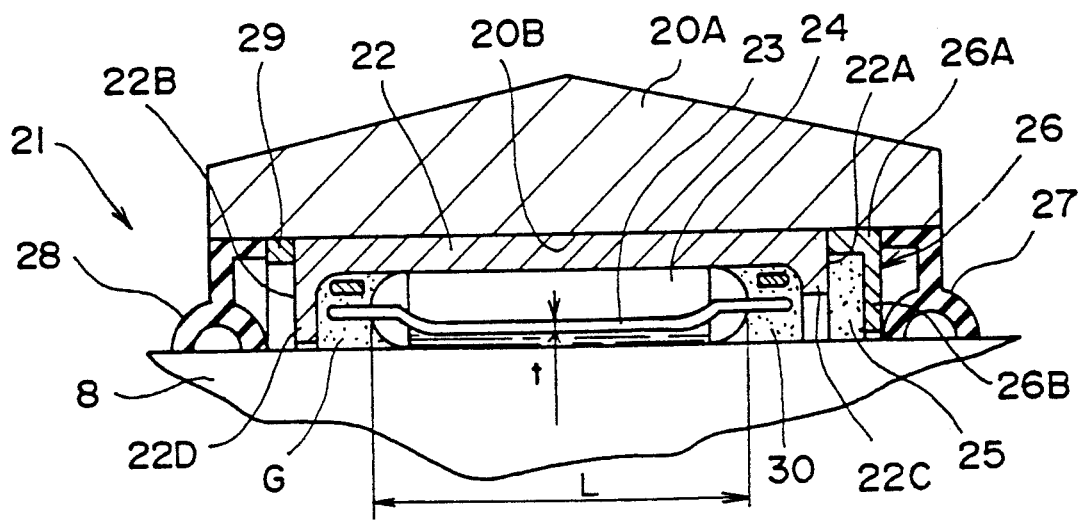
FIG. 4 is an enlarged longitudinal sectional view of the grease sealed bearing shown in FIG. 3.

A longitudinal sectional surface of the grease standing ring 26 has a shape similar to a letter L, as shown in FIGS. 3, 4. This grease standing ring 26 comprises a pipe part 26A as a small diameter part and a bulkhead part 26B as an extended part. The pipe part 26A has a shape similar to a cylinder, a center of which coincides with the center line A of the piston pin 8. Further, the pipe part 26A has a smaller inner diameter than an inner diameter of the bearing hole 20B. The bulkhead part 26B has a shape similar to a ring, a center of which coincides with the above mentioned center line A. The bulkhead part 26B is provided so as to extend between the inner wall of the bearing hole 20B and the outer wall of the piston pin 8. Also, the bulkhead part 26B is formed on the pipe part 26A so as to be as one piece with it. Therefore, the grease pool 25 is defined at a peripheral side thereof by the pipe part 26A, and defined at an axial direction end thereof by the bulkhead part 26B. An outer peripheral surface of the pipe part 26A is push fitted on an inner wall of the bearing hole 20B. Also, the bulkhead part 26B is formed so as to protrude on the pipe part 26A in a direction toward the center line A on the right end of FIG. 3. An inner surface of the bulkhead 26B and a peripheral surface of the piston pin 8 are so opposed to each other that an infinitesimal space, which serves as a restrictor, is formed between them.

As mentioned above, the oil-less type reciprocating motion compressor, which has the grease sealed bearing 21 applied to it, may have a construction similar to that of the conventional oil-less type reciprocating motion compressor as shown in FIG. 1, with the exception of the construction of the grease sealed bearing 21. A large end part not shown in the drawings, on a bottom portion of the connection rod 20, is connected with a crankshaft not shown in drawings, having a well-known construction as a generally conventional crankshaft. A rotational driving force of the crankshaft, which is driven by an external driving source, is transmitted to the piston 4 as a reciprocating driving force in a well-known manner. Then, the piston 4 reciprocates from a top dead point to bottom dead point or from the bottom dead point to the top dead point as shown in FIG. 1 inside the cylinder 1, in a well-known manner. Also, the connecting rod 20 swings repeatedly on a vertical direction against the paper surface of FIG. 1, at the same time as the above mentioned reciprocating motion of which rod 20 in well-known manner. A swinging angle of the connecting rod 20 at this time is a prescribed angle $\theta$.

Figure 5:
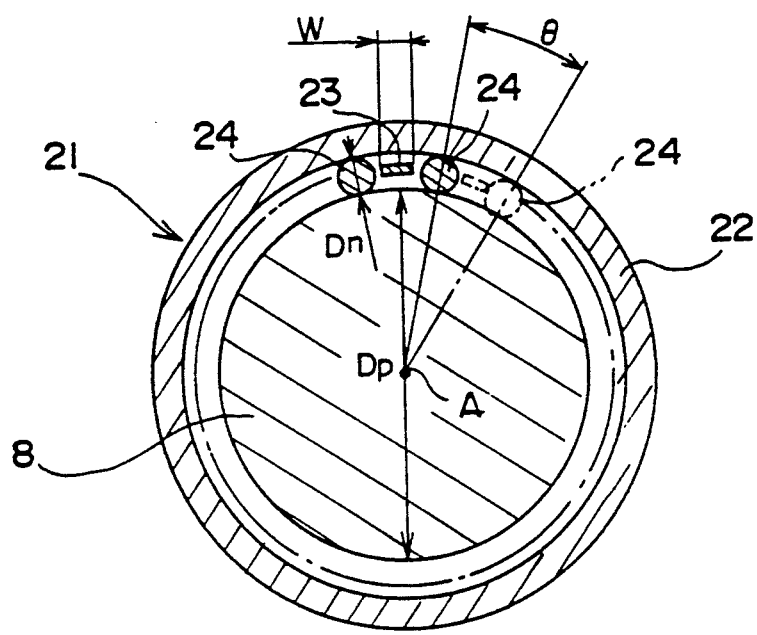
FIG. 5 is a cross sectional view of the connecting portion taken along a line V—V of FIG. 3, showing a moving space volume of needle rollers described herein after.
Figure 6:
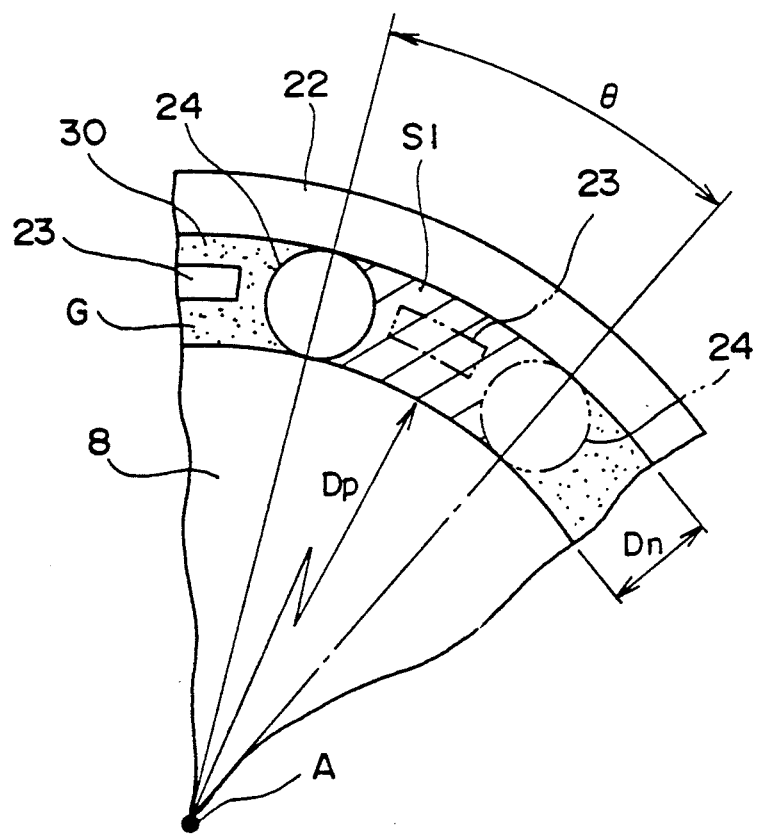
FIG. 6 is a partial enlarged view of the connecting portion shown in FIG. 5.

At this time, each of the needle rollers 24, 24, . . . of the grease sealed bearing 21 moves along an arc corresponding to the above mentioned swinging angle $\theta$, as shown in FIGS. 5, 6. That is, caused by the above mentioned swinging motion of the connection rod 20, the small end part 20A of the connecting rod 20 rotates. For example, one of the needle rollers 24, 24, . . . moves along an arc corresponding to the above mentioned swinging angle $\theta$, that is, from the position indicated by a continuous line to the position indicated by a double dot chain line in FIGS. 5, 6. The other needle rollers 24 move along an arc corresponding to the above mentioned swinging angle $\theta$ in the same manner as the above mentioned one of the needle rollers 24, 24, . . . That is, being caused by the rotation at the swinging on angle $\theta$ of the bearing hole 20B of the small end part 20A against the piston pin 8, each of the needle rollers 24, 24, . . . rolls to rotate between the peripheral surface of the piston pin 8 and the inner wall of the outer ring 22 of the grease sealed bearing 21. Then each of the needle rollers 24, 24, . . . rotates along the arc corresponding to the swinging angle $\theta$.

An amount V of the grease G in the grease containing space 30, which amount is extruded by each of the needle rollers 24, 24, . . . theoretically, is called "the quotation marks moving space volume". This amount of grease G is extruded while the piston 4 moves from the top dead point to bottom dead point, or vice versa as mentioned above. Then the amount V is obtained by the following manner. As shown in FIGS. 5, 6, an outer diameter of the piston pin 8 is indicated by Dp, an outer diameter of each of the needle rollers 24, 24, . . . is indicated by Dn; as shown in FIG. 4, an axial direction length of each of the rollers 24, 24, . . . is indicated by L, the number of the rollers 24, 24, . . . is indicated by N; as shown in FIG. 5, a width of each of the maintenance elements 23, 23, . . . is indicated by W; and as shown in FIG. 4, a thickness of each of the maintenance elements 23, 23, . . . is indicated by "t".

The above mentioned moving space volume V of grease G in the grease containing space 30 is extruded by each of the needle rollers 24, 24, . . . , while each of the needle rollers 24, 24, . . . rotates at the swinging angle $\theta$ between the outer wall of the piston pin 8 and the inner wall of the outer ring 22. In an example concerning one of the plurality of needle rollers 24, 24, . . . , the moving space volume V for one of the needle rollers 24, 24, . . . comprises a volume obtained by subtraction of a volume of each of the above mentioned maintenance elements 23, 23, . . . from a volume of a space defined between the needle roller 24, indicated by a continuous line in FIG. 5, and the other needle roller 24, indicated by a double dot chain line in FIG. 5. The above mentioned maintenance elements 23, 23, ... are located in the above mentioned grease containing space.

As regards the above mentioned volume, the volume of grease G between the needle roller 24 indicated by the continuous line and the needle roller 24 indicated by the double dot chain line is indicated by a hatched area S1 in FIG. 6. This cross sectional area of the volume S1 is represented by the following formula.

$$S1 = \frac{\pi}{4} \times [(Dp + 2Dn)^2 - Dp^2] \times \frac{\theta}{360} - \frac{\pi}{4} \times Dn^2$$

In the above formula, the units of angle $\theta$ is degrees.

Further, a cross sectional area S2 of the maintenance element 23 is given by a following formula.

$$S2 = W \times t$$

The moving space volume V, for the all pieces of the needle rollers 24, 24, ... for the length L, is obtained multiplying the difference between the above mentioned S1 and S2 by N and L. That is, it is represented by the following formula.

$$V = (S1 - S2) \times N \times L$$

This volume V is a maximum theoretical amount of the grease G extruded outside by each of the needle rollers 24, 24, ... from the grease containing space 30, while each of the needle rollers 24, 24, ... rotates as mentioned above, because some amount of the grease G in the grease containing space 30 is supposed to rotate being caused by the rotation of each of the needle rollers 24, 24, ..., then to remain in the equal intervals between the needle rollers 24, 24, ....

Experiments were carried out in which the grease sealed bearing 21 was provided on certain kinds of compressors respectively. As a result of this, it was confirmed that leaking of the grease G from the grease sealed bearing 21 was effectively prevented when the volume Vg of the grease pool 25 was approximately 40–60%, especially 50%, of the moving space volume V. That is, the grease G, extruded from the grease containing space 30 during the rotating of each of the needle rollers 24, 24, ..., is caught inside the grease pool 25. Further, the viscosity of the grease G is lowered as a result of heat on an area adjacent to the grease sealed bearing 21. The heat there generated by friction etc., which friction occurs in the compressor during the operation of it, in which compressor the grease sealed bearing 21 is provided. The grease G is returned to the grease containing space 30 again gradually as a result of surface tension effect of the grease G when the viscosity of the grease G is lowered as mentioned above. Then the periphery of each of the needle rollers 24, 24, ... is kept filled with the grease G, which has been remaining and that which has been returned from the outside.

The basic operating manner of the oil-less type reciprocating motion compressor, the construction of which was described above, is approximately the same as that of the compressor shown in FIGS. 1, 2, except for the operation described above.

Especially as regards the bearing connected between the connecting rod 20 and the piston 4 of a reciprocating motion machine as in the present embodiment, the small end part 20A is rotated alternately in the both forward and reverse directions, the rotation being caused by the swinging motion of the connecting rod 20. As a result of this, each of the needle rollers 24, 24, ... rotates alternately in both the forward and reverse directions. This motion of each of the needle rollers 24, 24, ... makes the grease G move violently. On the other hand, the grease G has certain inertia resulting from its rather high viscosity. Therefore sometimes the grease G cannot move so as to accompany the alternate rotation of each of the needle rollers 24, 24, ... in both the forward and reverse directions. The present invention is effective for preventing leaking of the grease G extruded from both end sides in an axial direction of each of the needle rollers 24, 24, ... for the reason mentioned above.

On the left oil seal 28 side of the outer ring 22 in FIG. 4, the inner peripheral surface of the rib part 22D (the phase "inner peripheral surface" means a surface facing the shaft 8) and the peripheral surface of the piston pin 8 face each other, a distance therebetween comprising an infinitesimal (very small) gap. Thus, while the grease G is extruded toward the rib part 22D side of the outer ring 22 by the motion of each of the needle rollers 24, 24, ..., a slight quantity of the extruded grease G is discharged toward the oil seal 28 side of the rib part 22D via the infinitesimal gap, the gap serving as a lubricant supply path. Lubrication is then performed between the inner peripheral surface of the oil seal 28 and the peripheral surface of the piston pin 8 by means of this slight quantity of discharged grease G. Most of the grease G, excepting the above slight quantity of discharged grease G, is blocked by means of the rib part 22D, so that the grease G is prevented from leaking toward the oil seal 28 side of the rib part 22D. Thus, most of the extruded grease G remains in the grease containing space 30.

On the contrary, on the right oil seal 27 side of the outer ring 22 in FIG. 4, a rather large opening is formed between the inner peripheral surface of the rib part 22C and the peripheral surface of the piston pin 8. Therefore, the grease G, extruded toward the rib part 22C by each of the needle rollers 24, 24, ..., is discharged through this rather large opening, which thus serves as a lubricant supply path, to the grease pool 25 and the grease G is stored there. Lubrication is then performed between the inner peripheral surface of the rib part 22C and the peripheral surface of the piston pin 8 by such grease G that is discharged through the opening between the inner wall of the bulkhead part 26B of the grease standing ring 26 and the outer wall of the piston pin 8 from the grease pool 25. Further, almost all of the grease caught inside the grease pool 25 is returned gradually to the periphery of each of the needle rollers 24, 24, ..., as a result of the lowering of the viscosity of the grease G, which grease G is heated by friction etc. occurring on the area adjacent to the grease sealed bearing 21 during the operation of the oil-less type reciprocating motion compressor, as mentioned above. Therefore the lubrication of each of the needle rollers 24, 24, ... between the inner wall of the outer ring 22 and the peripheral surface of the piston pin 8 can be definitely performed.

The following effects result upon using the grease sealed bearing 21 of this embodiment. That is, the grease G is supplied to each of the needle rollers 24, 24, ... stably for a long time. Therefore, the life time of the grease sealed bearing 21 and the oil-less type reciprocating motion compressor are greatly extended, and their reliability can be enhanced. Further, leaking of the grease G to the outside through the oil seals 27, 28 is effectively prevented. Therefore, compressed fluid with infinitesimal impurity of grease can be discharged, and thus, clean compressed air can be discharged.

Figure 7:
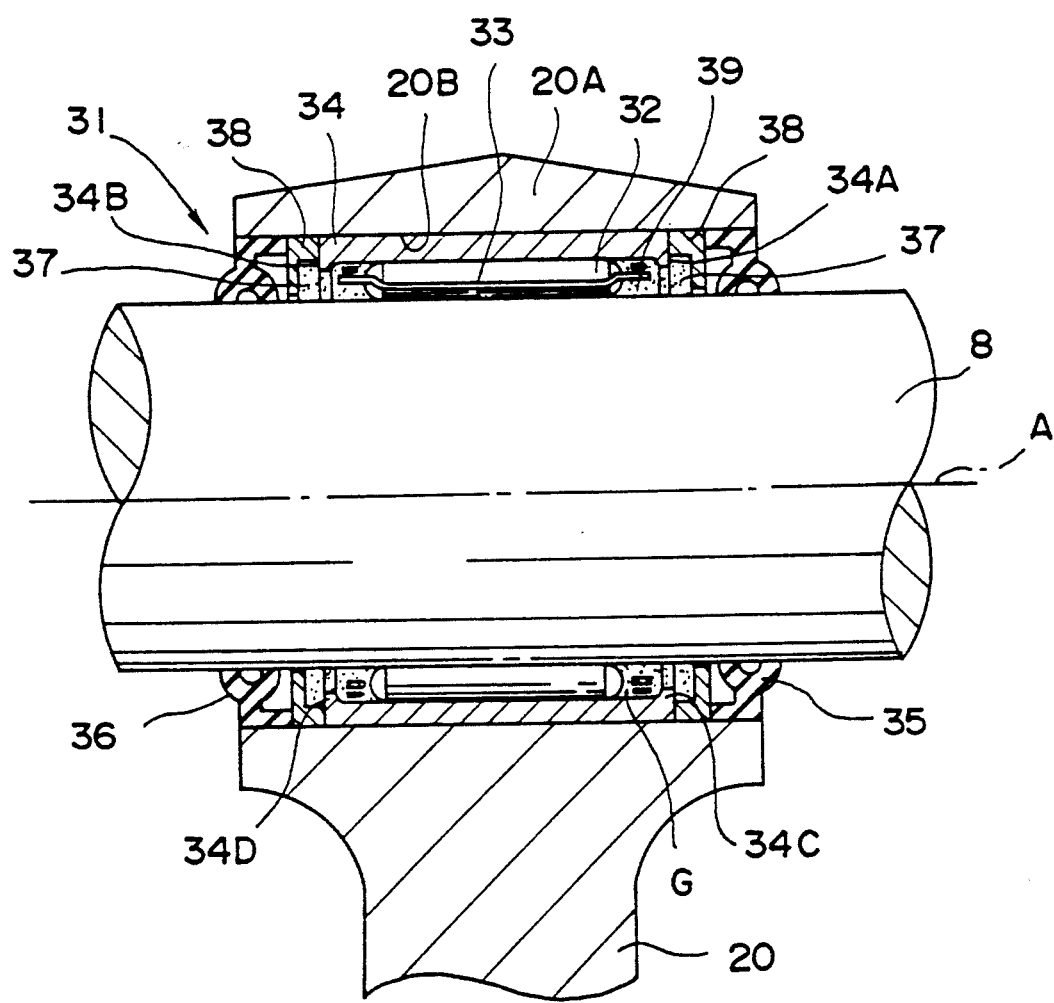
FIG. 7 is an enlarged longitudinal sectional view of a connecting portion of an oil-less type reciprocating motion compressor having a grease sealed bearing according to a second embodiment of the present invention applied to it, in which portion a small end part of a connecting rod and a piston pin are connected to each other, this connecting portion being an essential element of the compressor.

FIG. 7 shows a magnified longitudinal sectional drawing of a connecting portion of an oil-less type reciprocating motion compressor, in which a small end part of a connecting rod and a piston pin are connected to each other, this connecting portion being an essential element of the compressor. The compressor has a grease sealed bearing applied to it according to a second embodiment of the present invention. A feature of this embodiment is that grease standing rings are provided in both end sides in an axial direction of the outer ring. In the following description of the second embodiment a description regarding members corresponding to members of the first embodiment has been omitted, and such corresponding members have the same reference numerals applied thereto. The connecting portion shown in FIG. 7 can be applied to such compressor as shown in FIG. 1.

The grease sealed bearing 31 is fitted between an inner wall of a bearing hole 20B of a small end part 20A of a connecting rod 20 and a peripheral surface of a piston pin 8. This grease sealed bearing 31 has a construction approximately similar to that of the grease sealed bearing 21 of the first embodiment. That is, the grease sealed bearing 31 has an outer ring 34, which has a shape similar to a cylinder, a center of which coincides with a center line A of the piston pin 8. The outer ring 34 is press fitted in a center portion of the bearing hole 20B of the small end part 20A. Further, the grease sealed bearing 31 has needle rollers 32, 32, ... as rolling elements. Each of the needle rollers 32, 32, ... is located between the inner wall of the outer ring 34 and the peripheral surface of the piston pin 8. Further, the grease sealed bearing 31 has oil seals 35, 36 fitted on both the left and right sides of the bearing hole 20B as shown in FIG. 7.

Each of the needle rollers 32, 32, ... has approximately cylindrical shape, each roller 32 having a center line which is parallel to the center line A of the piston pin 8. Further, these needle rollers 32, 32, ... are located on the peripheral surface of the piston pin 8 at equal intervals from each other so as to surround it. Further, maintaining elements are located on the equal intervals between the needle rollers 32, 32, ... so as to maintain these intervals. Each of the oil seals 35, 36 has a shape similar to a ring, and has a shape approximately similar to the oil seals 27, 28 of the first embodiment.

However, in the second embodiment, there are grease standings ring 38, 38 fitted on end surfaces 34A, 34B on both sides of the outer ring 34, that is, on both sides of the outer ring 34 in an axial direction of the bearing hole 20B of the connecting rod 20. Each of grease pools 37, 37 is formed between each of the grease standing rings 38, 38 and each of the end surfaces on both sides in the axial direction of the outer ring 34.

Rib parts 34C, 34D are provided so as to protruded from the inner walls toward the axial A of the bearing on both sides of the outer ring 34 in the axial direction, that is, toward the peripheral surface of the piston pin 8, respectively. Each of the rib parts 34C, 34D has a ring shape, and a rather large opening is formed between the inner wall of each of the rib parts 34C, 34D and the peripheral surface of the piston pin 8. Further, a grease containing space 39 is defined by the inner wall of the outer ring 34, the peripheral surface of the piston pin 8 and the periphery of each of the needle rollers 32, 32, . ... This grease containing space 39 and each of the grease pools 37, 37 communicate with into each other through the above mentioned opening defined by the inner peripheral surfaces of the rib parts 34C, 34D and the peripheral surface of the piston pin 8. A longitudinal sectional surface of each of the grease standing rings 38, 38 respectively have shape similar to a letter L, as shown in FIG. 7, similar to the shape of the grease standing ring of the first embodiment, and an overall shape of each of the grease standing rings 38, 38 is ring shape.

A total capacity Vg′ of both of the grease pools 37, 37 is 40–60% or preferably 50% of the moving space volume V′. Therefore the respective volume Vg′/2 of each of the grease pools 37, 37 is approximately one half of the volume V of the above mentioned grease pool 25 of the first embodiment. The moving space volume V′ corresponds to the moving space volume V for the first embodiment.

In accordance with the above mentioned construction of the present embodiment, the grease G, which is extruded from the grease containing space 39 during the rotation of each of the needle rollers 32, 32, . ... , is caught in the grease pools 37, 37 provided on the both sides of the outer ring 34 in an axial direction thereof. Also, the grease G caught in the grease pools 37, 37 is returned successively inside the outer ring 34 from both of the ends of the outer ring 34, which returning action is caused by lowering of the viscosity of the grease G. This lowering of the viscosity of the grease G is caused by heat generated around the grease bearing 31, this generation of heat being caused by the operation of the oil-less type reciprocating motion compressor as mentioned before regarding the first embodiment. As mentioned above, an effect similar to that obtained by the first embodiment is obtained by the second embodiment.

The above mentioned detailed explanation of the present invention can be summarized as follows. The grease sealed bearing according to both of the embodiments comprises the outer ring press fitted inside the small end part of the connecting rod, the plurality of rolling elements located between the outer ring and the peripheral surface of the piston pin, and the grease standing ring provided between the outer ring and oil seal. In addition, the grease containing space is also formed, in the periphery of the above mentioned plurality of rolling elements, between the outer ring and the peripheral surface of the piston pin. And grease pool is formed between an end surface in an axial direction of the above mentioned outer ring and the grease standing ring.

The capacity of one of the grease pool is in the range of 40–60% of the total of the moving space volume. The meaning of above mentioned moving space volume is the theoretical amount of the grease G, which is extruded by the rolling elements, this extrusion being caused by the movement of the piston of the oil-less type reciprocating motion compressor from a top dead end to a bottom dead end or vice versa. Thus even if the grease, with which the grease containing space is filled, is extruded toward both end sides of the bearing in axial directions thereof from the grease containing space, this extrusion being caused by the movement of each of the rolling elements, the extruded grease is caught in the grease pool. Also, the grease caught in each grease pool is returned successively into the grease containing space. Therefore the periphery of each of the rolling elements can be continuously filled with the grease all the time. As mentioned above, the grease can be stably supplied for a long time. Therefore, the life time of the grease sealed bearing and the oil-less type reciprocating motion compressor can be extended, and also a clean compressed fluid can be supplied by the oil-less type reciprocating motion compressor. Two grease pools may be provided in both sides of the outer ring in axial direction thereof. Each of the two pools is defined by respective one of the grease standing parts. In this case, the total capacity of both of the pools is in the range of 40–60% of the total of the moving space volume.

Further, in the above mentioned embodiments, the approximately cylindrical shaped needle rollers 24, 32 are used as rolling elements of the grease sealed bearings 21, 31. However the present invention is not limited to such constructions, and the rolling elements having other shapes, for example spherically shaped, etc. may be used for the grease sealed bearing of the present invention.

Also, the construction of the grease sealed bearing of the present invention is not be limited to that of the above embodiment. That is, for example, it is not limited to the constructions having the outer rings 22, 34 respectively, and instead it may have a construction where the needle rollers are located between the inner peripheral surface of the bearing hole of the small end part of the connecting rod and the peripheral surface of the piston pin as shown in FIG. 2.

Further, the present invention is not limited to these preferred embodiments, and various variations and modifications may be made without departing from the scope of the present invention.

What is claimed is:

1. A lubricant sealed bearing provided between a shaft part and a bearing part, arcuate reciprocal movement occurring between said parts, said bearing comprising:
    at least one rolling element located so as to be capable of rolling between said shaft part and said bearing part;
    lubricant provided between said shaft part and bearing part;
    at least one annular lubricant enclosing member surrounding said shaft part for enclosing the lubricant so as to maintain the lubricant in contact with said rolling element, said lubricant enclosing member having an opening surrounding said shaft part;
    at least one annular lubricant standing member surrounding the shaft part and contiguous to one end of said lubricant enclosing member along the axial direction of the shaft part for forming a lubricant pool in fluid communication with the opening for receiving lubricant flowing out of said opening of said lubricant enclosing member, said flowing out being caused by the arcuate reciprocal movement of said shaft part and said bearing part, no part of said lubricant standing member being located between said lubricant pool and said shaft part, the capacity of said lubricant pool being 40–60% of a theoretical amount of lubricant flowing out of said opening as a result of the arcuate reciprocal movement of the shaft part and the bearing part; and
    at least one annular lubricant sealing member provided between said shaft part and said bearing part, said lubricant sealing member being located along the axis of the shaft part at the opposite side of said lubricant standing member to a side at which said lubricant enclosing member is located.

2. A lubricant sealed bearing according to claim 1, wherein said lubricant sealed bearing comprises:
    two said lubricant standing members, each of the standing members being contiguous to an end of said lubricant enclosing member and defining respectively first and second pool, said first and second pools forming said lubricant pool.

3. A lubricant sealed bearing according to claim 1, further defined as provided between a shaft part comprising a piston pin which has an approximately cylindrical shape and a bearing part having a piston pin inserting hole for receiving said piston pin, said hole having an approximately cylindrical shape, which shape has an inner diameter not less than the outer diameter of said piston pin.

4. A lubricant sealed bearing according to claim 3, wherein:
    said rolling element has an approximately cylindrical shape which has a center line approximately parallel to a center line of said piston pin.

5. A lubricant sealed bearing according to claim 3, wherein:
    a plurality of said rolling elements are located between said piston pin and piston pin inserting hole, so as to surround a peripheral surface of said piston pin in a circumferential direction.

6. A lubricant sealed bearing according to claim 1, wherein:
    said lubricant standing member has a pipe-like part, which has an inner diameter smaller than an inner diameter of said bearing part and which lies along the inner diameter of the bearing part; and an extension part, which is provided to extend toward said shaft part,
    said lubricant pool being defined by said pipe-like part and extension part.

7. A lubricant sealed bearing according to claim 1, wherein:
    said lubricant standing member has in a longitudinal section, taken on a plane parallel to the axis of the shaft, an L shape, said lubricant standing member being provided between an inner peripheral surface of said bearing part and a peripheral surface of said shaft part.

8. A lubricant sealed bearing according to claim 1 wherein said lubricant sealing member is provided adjacent said lubricant standing member.

9. A lubricant sealed bearing according to claim 8, wherein:
    a lubricant supplying path, for supplying lubricant to said lubricant sealing member, is provided in said lubricant standing member.

10. An oil-less type reciprocating motion machine comprising:
    a cylinder having a sealing chamber formed therein;
    a piston provided inside said cylinder so as to be capable of reciprocating, which piston defines said sealing chamber inside said cylinder;
    a piston pin provided in said piston;
    a connecting rod, a large end part thereof being connected to a crankshaft that is rotated by a driving source, and a small end part thereof being connected to said piston pin;
    a lubricant sealed bearing, which enables the small end part of said connecting rod to smoothly rotate about said piston pin, the bearing being provided between said piston pin and a piston pin inserting hole formed in the small end part of said connecting rod;

and at least one lubricant sealing member, said member being formed between said piston pin and the piston pin inserting hole that is formed in the small end part of said connecting rod;

said lubricant sealed bearing comprising;

a plurality of rolling elements, which are located between said piston pin and said piston pin inserting hole;

a lubricant containing space defined in said lubricant sealed bearing by said piston pin inserting hole, said piston pin, and said rolling elements, lubricant being provided in said lubricant containing space;

at least one holding member, said member preventing said rolling elements from shifting in an axial direction thereof;

a lubricant standing member, said member defining a lubricant pool for receiving lubricant that is discharged from said lubricant containing space, and being adjacent to one end of said lubricant sealed bearing, said standing member being located between said piston pin and the piston pin inserting hole that is formed on the small end part of said connecting rod;

a lubricant supplying path formed in said lubricant standing member for supplying lubricant to said lubricant sealing member; and the capacity of said lubricant pool defined by said lubricant standing member, being 40-60% of a theoretical amount of lubricant that is discharged by movement of said rolling elements of said lubricant sealed bearing, the movement of said rolling elements being caused by the movement of said piston from a top dead point to bottom dead point and vice versa.

11. An oil-less type reciprocating motion machine according to claim 10, wherein said lubricant sealed bearing comprises:

two said lubricant standing members, each of said members defining a respective first and second pool, said first and second pools forming said lubricant pool for receiving lubricant discharged from said lubricant sealed bearing, each of said standing members being adjacent to a respective end of said holding member, and said standing members being located between said piston pin and the piston pin inserting hole that is formed on the small end part of said connecting rod;

two said lubricant supplying paths for supplying lubricant to a pair of lubricant sealing members, each of said paths being formed in a respective one of said lubricant standing members.

12. A lubricant sealed bearing provided between a shaft part and a bearing part, which parts rotate relative to each other sequentially in the forward and reverse directions, said bearing comprising:

at least one rolling element located so as to be capable of rolling between said shaft and said bearing part;

lubricant provided between said shaft part and bearing part;

at least one lubricant standing member, forming a lubricant pool for receiving lubricant flowing out from said lubricant sealed bearing by the relative rotation of said shaft part and said bearing part; and wherein a capacity of said lubricant pool is 40-60% of a theoretical amount of lubricant extruded by movement of the rolling element of said lubricant sealed bearing, the movement of said rolling element being caused by the relative rotation of said shaft part and said bearing part in the forward and reverse directions.

13. An oil-less type reciprocating motion machine comprising:

a cylinder having a sealing chamber formed therein;

a piston provided inside said cylinder so as to be capable of reciprocating, which piston defines said sealing chamber inside said cylinder;

a piston pin provided in said piston;

a connecting rod, a large end part thereof being connected to a crankshaft that is rotated by a driving source, and a small end part thereof being connected to said piston pin; and a lubricant sealed bearing, which enables the small end part of said connecting rod to smoothly rotate about said piston pin, the bearing being provided between said piston pin and a piston pin inserting hole formed in the small end part of said connecting rod;

and wherein said lubricant sealed bearing comprises:

a plurality of rolling elements, which are located between said piston pin and said piston pin inserting hole;

a lubricant containing space defined in said lubricant sealed bearing by said piston pin inserting hole, said piston pin and said rolling elements, lubricant being provided in said lubricant containing space;

at least one holding member, said member preventing said rolling elements from shifting in an axial direction thereof, said holding member enclosing the lubricant so as to maintain the lubricant in contact with said rolling elements, and said holding member having an opening surrounding said shaft part;

a lubricant standing member surrounding the shaft and contiguous with said holding member along the axial direction of the shaft for forming a lubricant pool in fluid communication with the opening for receiving lubricant flowing out via said opening of said holding member, said standing member being located between said piston pin and the piston pin inserting hole that is formed on the small end part of said connecting rod, no part of said lubricant standing member being located between said lubricant pool and said piston pin, the capacity of said lubricant pool being 40-60% of a theoretical amount of lubricant flowing out of said opening as a result of movement of said rolling element of said lubricant sealed bearing;

at least one lubricant sealing member provided between said piston pin and the piston pin inserting hole formed in the small end part of said connecting rod, said lubricant sealing member being located along the axis of the shaft at the opposite side of said lubricant standing member from the side at which said holding member is located; and a lubricant supplying path in said lubricant standing member for supplying lubricant to said lubricant sealing member; and wherein:

said lubricant standing member has a pipe-like part which has an inner diameter smaller than an inner diameter of said piston pin inserting hole, and an extension part, which is provided to extend between said piston pin inserting hole and said piston pin; and said lubricant pool is defined by said pipe-like part and said extension part.

14. An oil-less type reciprocating motion machine according to claim 13, wherein;

said lubricant supplying path formed in said lubricant standing member, is provided between said piston pin and said extension part.

15. An oil-less type reciprocating motion machine according to claim 13, wherein:

said lubricant standing member has a shape similar to a ring, and has in a longitudinal sectional, taken on a plane parallel to the axis of the piston pin an L shape, said lubricant standing member being provided between an inner peripheral surface of said piston pin inserting hole and a peripheral surface of said piston pin.

16. An oil-less type reciprocating motion machine according to claim 13, wherein said lubricant sealed bearing comprises:

two said lubricant standing members, each of said members defining a respective first and second pool, said first and second pools forming said lubricant pool for receiving lubricant discharged from said lubricant sealed bearing, each of said standing members being adjacent to a respective end of said holding member, and said standing members being located between said piston pin and the piston pin inserting hole that is formed on the small end part of said connecting rod;

two said lubricant supplying paths for supplying lubricant to a pair of lubricant sealing members, each of said paths being formed in a respective one of said lubricant standing members;

each of said lubricant standing members having a pipe-like part, each of which parts has an inner diameter smaller than an inner diameter of said piston pin inserting hole; and extension parts, each of which parts is provided to extend toward said piston pin; and each of said first and second pools being defined by a respective one of said pipe-like parts and a respective one of said extension parts.

17. An oil-less type reciprocating motion machine according to claim 16, wherein;

each of said lubricant supplying paths formed in a respective one of said lubricant standing members, is provided between said piston pin and said extension parts.

18. An oil-less type reciprocating motion machine according to claim 16, wherein:

said lubricant standing members, respectively have a shape of a ring, and respectively have a longitudinal sectional surface taken on a plane parallel to the axis of the piston pin which has an L shape, said lubricant standing members being respectively provided between an inner peripheral surface of said piston pin inserting hole and a peripheral surface of said piston pin.

* * * * *